(12) United States Patent
Whitley et al.

(10) Patent No.: US 11,301,491 B2
(45) Date of Patent: Apr. 12, 2022

(54) DATA AUTHENTICATION TECHNIQUES USING EXPLORATION AND/OR PRODUCTION DATA

(71) Applicant: SCHLUMBERGER TECHNOLOGY CORPORATION, Sugar Land, TX (US)

(72) Inventors: Stephen Whitley, Houston, TX (US); Josiane Magnoux, Houston, TX (US); Colin Wier, Houston, TX (US); Brandon Plost, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 58 days.

(21) Appl. No.: 16/646,233

(22) PCT Filed: Sep. 13, 2018

(86) PCT No.: PCT/US2018/050886
§ 371 (c)(1),
(2) Date: Mar. 11, 2020

(87) PCT Pub. No.: WO2019/055655
PCT Pub. Date: Mar. 21, 2019

(65) Prior Publication Data
US 2020/0272640 A1    Aug. 27, 2020

Related U.S. Application Data

(60) Provisional application No. 62/557,937, filed on Sep. 13, 2017.

(51) Int. Cl.
*G06F 16/28* (2019.01)
*G06F 16/2457* (2019.01)
(Continued)

(52) U.S. Cl.
CPC .......... *G06F 16/283* (2019.01); *G01V 11/002* (2013.01); *G06F 16/24573* (2019.01); *G06F 16/909* (2019.01); *G06F 16/9024* (2019.01)

(58) Field of Classification Search
CPC .. G06F 16/24573; G06F 21/62; G06F 16/283; G06F 16/909; G06F 16/9024
(Continued)

(56) References Cited

U.S. PATENT DOCUMENTS 8,392,419 B2 * 3/2013 Heaton ................... G06F 19/00
                                                    707/737
8,577,823 B1    11/2013 Gadir
(Continued)

OTHER PUBLICATIONS

International Preliminary Report on Patentability for the counterpart International patent application PCT/US2018/050886 dated Mar. 26, 2020.
(Continued)

*Primary Examiner* — Shahid A Alam
(74) *Attorney, Agent, or Firm* — Michael Guthrie

(57) ABSTRACT

Exploration and production data can be provided from one or more devices and categorized at a data lake system. The data lake system can include a temporary data repository where data is initially analyzed for determining whether the data includes data markers. Data markers can be correlated to existing data provided by the data lake system in order that tags can be generated for the incoming data. When data markers or other metadata is unavailable from the incoming data, the incoming data can be flagged for further processing to identify any available context that can be used as a basis for tagging.

21 Claims, 11 Drawing Sheets

(51) Int. Cl.
*G06F 16/909* (2019.01)
*G06F 16/901* (2019.01)
*G01V 11/00* (2006.01)

(58) Field of Classification Search
USPC .................................................. 707/705, 741
See application file for complete search history.

(56) References Cited

U.S. PATENT DOCUMENTS

| 2011/0191343 | A1* | 8/2011 | Heaton ................... | G16H 50/70 |
| | | | | 707/737 |
| 2011/0258007 | A1* | 10/2011 | Heggelund ............ | G06Q 10/00 |
| | | | | 705/7.11 |
| 2013/0232158 | A1* | 9/2013 | Heggelund ............. | G06F 16/23 |
| | | | | 707/756 |
| 2014/0081981 | A1* | 3/2014 | Morris .............. | G06F 16/24573 |
| | | | | 707/741 |
| 2015/0120748 | A1* | 4/2015 | Kraynak ............. | G06F 16/2228 |
| | | | | 707/741 |
| 2016/0063402 | A1 | 3/2016 | Webb et al. | |
| 2017/0006135 | A1 | 1/2017 | Siebel et al. | |
| 2017/0139078 | A1 | 5/2017 | Knight et al. | |

OTHER PUBLICATIONS

International Search Report and Written Opinion for the counterpart International patent application PCT/US2018/050886 dated Jan. 11, 2019.

* cited by examiner

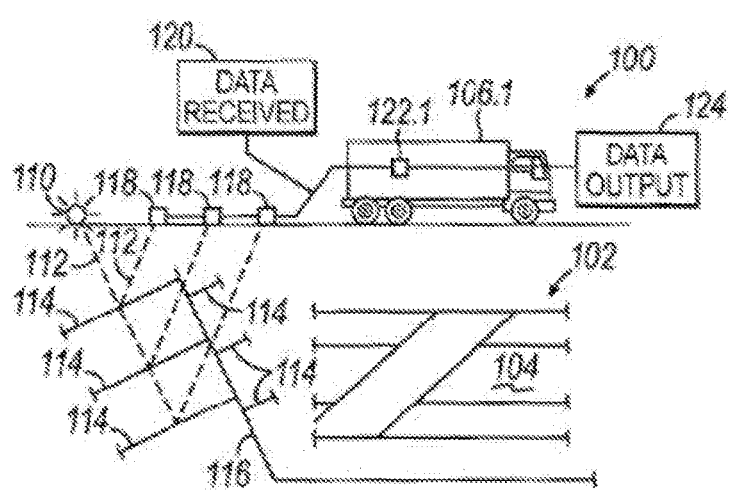
FIG. 1.1
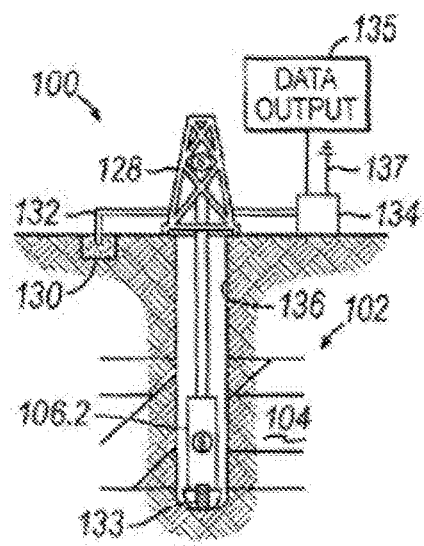
FIG. 1.2
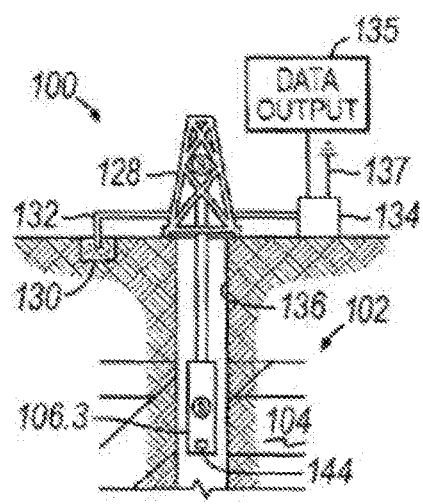
FIG. 1.3
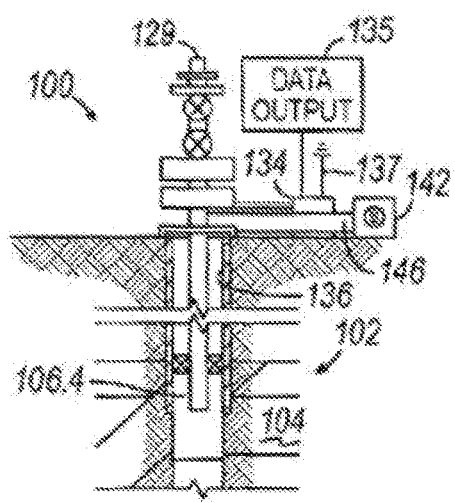
FIG. 1.4

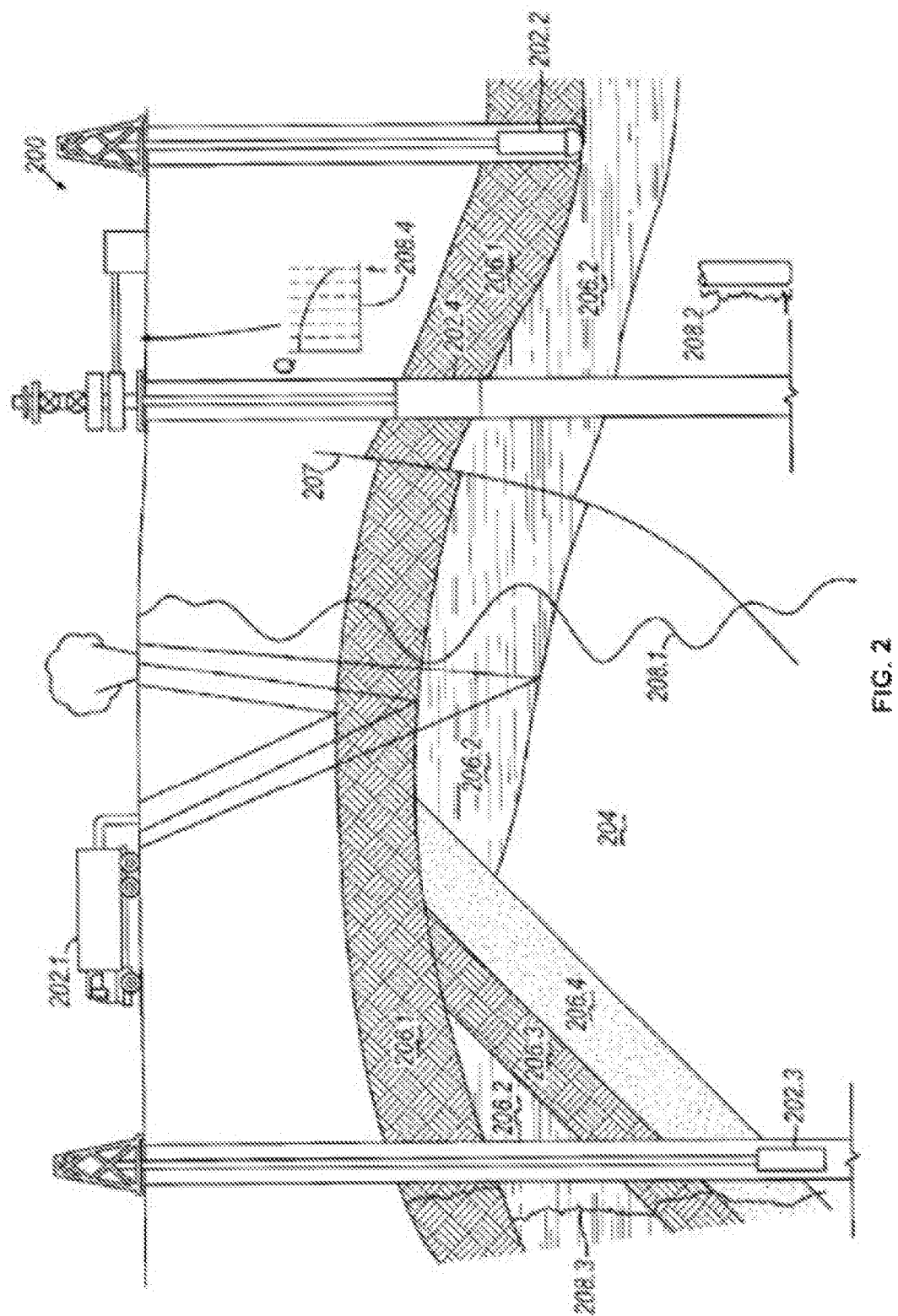

DATA AUTHENTICATION TECHNIQUES USING EXPLORATION AND/OR PRODUCTION DATA

BACKGROUND

In the oil and gas industry, data is often generated from a variety of sources for clients that seek to remain privy to the latest trends in exploration and production technology. When data is not consistent or inaccessible, decisions made by such clients may not be the most well-informed, potentially resulting in production inefficiencies. Furthermore, enterprises of all types and sizes are coping with a wider variety of data at a very large scale, making it more difficult than ever to realize production insights. At the same time with the growth in cloud based commodity computing, it is becoming increasingly difficult to package insights for delivery to customers and clients.

SUMMARY

Methods, apparatus, systems, and computer-readable media are set forth for processing exploration and production data to make such data more readily available for clients seeking to leverage the data for analytics and other services. In some implementations, a method implemented by one or more processors is set forth as including operations such as receiving data from a client device. The data can be associated with an operation occurring at an exploration and production system. The operations can further include analyzing the received data to determine whether a data marker is associated with the received data, and determining, based on the data marker, whether metadata is available at a data lake system for tagging the received data. The method can also include, when metadata is available for tagging the received data, tagging the received data to provide a correlation between the received data and existing data in the data lake system. Additionally, the method can include, when metadata is unavailable for tagging the received data, flagging the received data for further processing by the data lake system. The received data can be stored at a temporary data repository of the data lake system during the analyzing of the received data. The received data can be transmitted to a data object repository subsequent to the received data being tagged.

In some implementations, the metadata can be associated with a contract that is embodied as contractual metadata stored in a remote device that is separate from the device that hosts the data lake system. The data can be received from the client device concurrently with the operation occurring at the exploration and production system. In other implementations, the method can include, when the metadata is available for tagging the received data, storing the received data in association with the metadata in a data object repository of the data lake system. The data marker can identify a geographic location from which the received data was transmitted. In some implementations, the method can include authenticating the received data according to whether the received data corresponds to the exploration and production system.

Some implementations also include a system including one or more processors and memory configured to store instructions that, when executed by one or more processors, cause the one or more processors to perform any of the aforementioned operations, as well as a non-transitory computer readable medium configured to store instructions that, when executed by one or more processors, cause the one or more processors to perform any of the aforementioned operations.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIGS. 1.1-1.4 illustrate simplified, schematic views of an oilfield having subterranean formation containing reservoir therein in accordance with implementations of various technologies and techniques described herein.

FIG. 2 illustrates a schematic view, partially in cross section of an oilfield having a plurality of data acquisition tools positioned at various locations along the oilfield for collecting data from the subterranean formations in accordance with one or more embodiments.

DETAILED DESCRIPTION OF THE INVENTION

Figure 3:
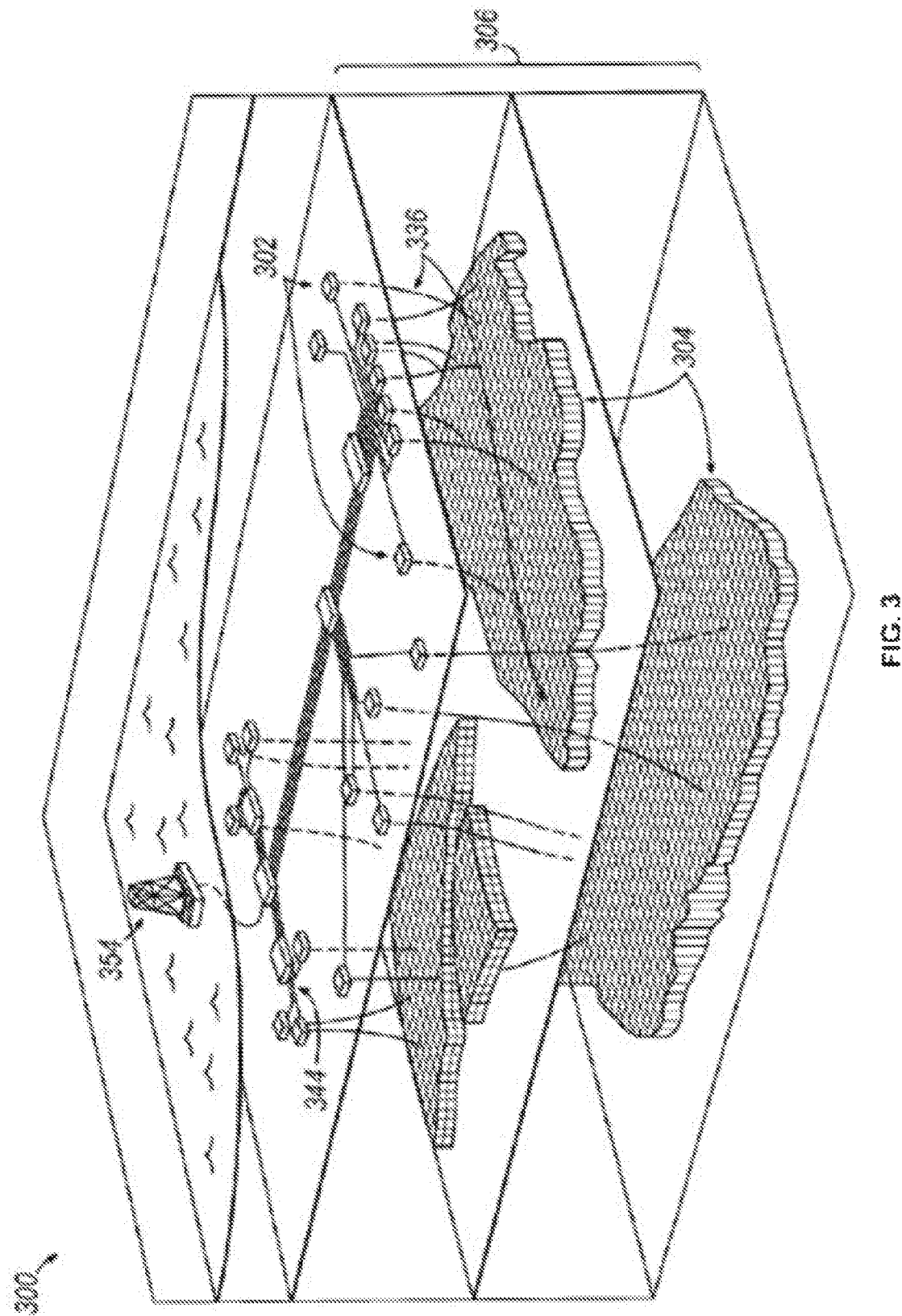
FIG. 3 illustrates a production system for performing one or more oilfield operations in accordance with one or more embodiments.

The described embodiments relate to systems, methods, and apparatus for processing exploration and production data to make such data more readily available for clients seeking to leverage the data for analytics and other services. In this regard, the term "exploration and production" generally refers to data, activities, operations, etc. associated with the exploration and/or production of natural resources. Thus, exploration and production data may include data that is associated solely with natural resource exploration activities, data associated solely with natural production activities, data associated with both natural resource exploration activities and natural resource production activities, and even data associated with support activities for any of the aforementioned natural resource activities. The exploration and production data can be made available at a data lake, which can act as a data repository that automatically authenticates data that is provided to the data lake. Typically, data that is transmitted to a repository can be associated with fields that must be manually modified in order that the data can be properly stored in the repository. Such manual modification can be time consuming, rendering the data repository temporarily incomplete until the repository can be updated. In order to resolve this and other limitations, an automated data ingestion process is set forth for authenticating and/or correctly categorizing data into a transformative manner.

In some implementations, data can be received from a client device or other source domain. Thereafter, the data can be received at a data lake that includes one or more applications for processing the received data. The received data can be parsed in order to identify metadata that relates to the origin of the received data, the owner(s) of the received data, and/or contracts that can be associated with the received data. The received data can then be correlated to tags that are associated with the identified metadata (e.g., origins, owner names, contract data, etc.). For instance, the received data can be associated with a job identifier, which can be used subsequently for tagging or linking the received data with additional contextual and/or environmental information that has been captured in other business systems automatically or manually. Additional contextual and/or environmental information can include data that is provided from other clients, such as those providing tool properties, text results, repair history, failure rates, and/or any other data that can be associated with an exploration and production system. Data that becomes apparent during a particular job, or after a job is completed, can also be subsequently associated with the received data using any relevant tags that have been correlated to the received data. For instance, an amount of consumables used on a job (e.g., a volume or composition of slurry used) can be correlated to the data received at the data lake in order that the information can be more readily accessible to clients.

The data lake can be embodied as a data lake system that can receive data from one or more different oilfield operations. In some implementations, the oilfield operations can include production operations, drilling operations, tooling operations, and/or monitoring operations, among others. The received data can be tagged upon receipt and stored in a data repository of the data lake. The received data can be tagged before or after the received data is stored within the data repository. For instance, during preparatory work for a job, such as an oilfield operation, the data can be generated during a preparatory operation can be received and tagged at the data lake system. While the job is being performed, data can be received and tagged at the data lake system in real time in order that clients can more readily access the data during operations. Furthermore, after an operation, such as a batch oilfield operation, is complete, the data can be received and tagged at the data lake system in order that the data can be accessed for providing analysis of the operation. In some implementations, data generated during an operation can be provided using information gathered from sensors or other tools that were employed during the operation.

The data lake system can include a temporary data repository (i.e., a data landing zone), an analysis module for analyzing the data in the temporary data repository, a metadata repository for storing metadata collected from data in the temporary data repository, and a data object repository. The data lake system can be connected to or in communications with a contract system. The contract system can include contract metadata and a contract repository, which can be used by the data lake system to generate tags that can be correlated to the data in the data object repository.

The data object repository can include data that is initially provided to the temporary data repository and authenticated as exploration and production data. Furthermore, the data in the temporary data repository can be processed by the data lake system to identify markers that can be associated with tags for the data objects. For instance, the markers can indicate a location from which the data was transmitted, a name or type of sensor by which the data was generated, a job identifier associated with a particular oilfield operation, a time stamp corresponding to an operation, and/or a name or type of computer from which the data. When no marker is included with the data, the data can be flagged for further processing and/or inspection.

In some implementations, when markers are associated with data provided to the data lake system, the data lake system can identify other metadata to associate with the received data based on a request for metadata, the markers, and/or the data available to the data lake system. In some implementations, a contract repository that is in communications with the data lake system can include information related to contracts pertaining to the received data. Metadata associated with one or more contracts can be provided to the data lake system, when the data lake system receives data associated with the one or more contracts. In response, the data lake system can generate tags for the received data. Once the tags have been correlated to the received data, the received data can be transmitted from the temporary data repository to the data object repository of the data lake system. Any metadata associated with the received data can also be stored in the data object repository and/or a metadata repository.

The data lake system can authenticate data to determine whether any portion of the received data has been corrupted. Furthermore, a format of the received data can be processed to identify an origin of the received data. For instance, received data can be analyzed to identify a tool or component from which the received data originated. Furthermore, the received data can be used to determine whether the tool or component was federated with the system.

In addition, while in some embodiments the data managed by a data lake system may be stored exclusively within one or more data repositories internal to the data lake system, in other embodiments at least some of the data managed by a data lake system may be maintained and stored in an external data repository, e.g., the data repository in which the data was originally stored. Thus, when the data is ingested into the data lake system, metadata characterizing the data may be stored within the data lake system to enable the data to be located or otherwise identified, but later retrieval or other access of the data may be performed from the original, external data repository.

In other implementations, a system for ingesting data at a data repository (data lake) is set forth. Current problems with such ingestion are that they are incapable of correctly authenticating and automating the process. For example, data is transmitted from a field to a data repository. There the data can sit until it is manually associated with the correct data. However, the association can be time consuming and incomplete. Thus, what is offered by the system is an automated ingestion process to authenticate and correctly categorize data in a transformative manner.

The implementations set forth involve receiving a data object, parsing the data object or related metadata for particular information about the origin of the data object, looking up information about the owner and contracts associated with the data object, then associating the data object with the owner and contracts through relevant and corresponding tags. In some implementations, the data object can be associated with a job identifier so that the data object can be linked with additional contextual/environmental information captured in other business systems automatically or manually. For instance, the data object can subsequently be linked to a tool, a test result, a failure, a repair, and/or any other information that can be associated with a job or project. The data object can be correlated to the job for observations on the job event, circumstances, related to other tools used on the job like surface tools, related to consumables used on the job like the chemical composition of slurry.

Other implementations may not employ parsing metadata about a data object and instead can infer information from the data object itself. The system or data lake can be designed to intake data from an oilfield operation, such as a production, drilling, or monitoring operation, tools and tag the data appropriately as it is received, as it is stored within a landing zone, or after it is stored within a data repository. In some implementations, the data can be related to an oilfield operation and ingested before (in the case of preparatory work), during (in the case of real-time ingestion), or after (batch) the oilfield operation. Such an oilfield operation may be from a tool or from sensors other than those embedded in tools.

In some implementations, a data object can be analyzed in landing zone (e.g., as it enters a landing zone or after it is fully transmitted to a landing zone) to authenticate that it is oil and gas data as well as determine markers associated with the data. The markers can be used to retrieve tags for the data object and are determined through an analysis of information about the data object, such as the location from which it is transmitted, the sensor unique ID (UID) from which the data object was generated, the UID of the tool from which the data object was generated, a job ID corresponding to an oilfield operation, the start or end date/time of a run, or the computer from which the data object was transmitted. If no markers are found the data object is flagged for inspection.

When markers are found the system receives metadata to associate with that data object based on a request for the metadata based on the markers or based on its own repository of metadata. In some embodiments, the system sends information about the markers to a contract repository. The contract repository, in turn, contains information about contracts that may be associated with contracts as well as metadata to associate with data objects relating to contracts. When the contracts repository has metadata about a contract associated with the data object it transmits that to the system. The system, in turn, tags the data object with the metadata and moves the data object from the landing zone to a data object repository. Metadata associated with the data object is then stored with the data object in the data object repository or in a metadata repository for data objects.

In another embodiment, the system can retrieve information about markers from its own metadata repository or from similar data objects in its data object repository and completes the operations described herein to tag data objects and store them (and related metadata).

When the system cannot find a particular marker, or when it is unable to receive or determine metadata for a data object (e.g., because such metadata was not pre-populated) it flags the data object for inspection. With respect to specific examples, one may be from a tool offered by a tooling company, and can include a tool ID, job ID, run/stop date/time, as well as other data.

Regarding authentication, such authentication can take the form of analyzing the data object to determine whether any part of it has been corrupted, analyzing the format of the data object to determine what tool that data object has originated from as well as whether other data associated within the data object is present and valid, analyzing the data object to determine whether it is from an expected tool or component, or otherwise authenticating (e.g., through identifying what tool originated the data object and determining whether that tool was previously federated with the system, through identifying what data the data object is associated with and determining whether that type of data was previously federated with the system, etc.).

Regarding the tags, several tags can be used to determine and/or gate-keep access control to the data object. The tags described herein can be exemplary, and additional tags may be included, such as date and time (e.g., dates and times a data object is generated, received, and/or stored), expiration date for the data object, actions to perform upon the expiration date, whether anonymization of the data object has been requested, specifics to such anonymization, a person associated with the upload of the data object, a business unit (e.g., internal company unit) associated with the upload of the data object, other data access restrictions to the data object, rights of use for the data object (e.g., commercially, non-commercially, in marketing, in training, as part of a product/service, for analytics, for research, for technical papers, for distribution to particular clients), and whether any license is associated with the data object (e.g., for example as may be provided with third-party public data objects licensed under open source license schema).

In some implementations, exploration and production data can be incorporated into a data lake that is capable of various data flow configurations and data ingestion processes. The ingestion process can include manual ingestions, tagging through a cloud approval site, ingested batch per batch after tagging, impediment to scalability, automatic ingestion, ingestion that can be scalable, each channel of each tool of an exploration and production system mapped to a data type, each channel of a tool fully tagged before the tool is operated, and/or automatically transmitted tags on real-time basis to the data lake. In some implementations, tags can classify data as company owned data, public domain data, equipment health, equipment performance, conditions of deployment of equipment, index data that identifies specifications of a wellbore (such as a well name, longitude, latitude, depth), data delivered to a client for services performed (including any reservoir or formation evaluation data), third party data used with express permission from a third party, including data provided on behalf of a client, and/or any other data that can be associated with an exploration and production system.

The tagging of data being ingested by the data lake can be based on data types from predetermined defaults, client data, third party data, public domain data, controller data, index data, contract data, third party data, and/or any other basis from which exploration and production related data can be tagged. Data can be tagged based on contracts that are for a future date, contracts that occur before a particular data, or contracts that are currently being executed. The dates of the contracts can refer to when a contract has been approved or is otherwise ready for execution. Legal markers can assist in tagging data according to contractual data. Such legal markers can include residency data, country of origin data, tool identifier data, privacy law data for a jurisdiction, and/or any other contract related data classifications. In some implementations, data tags can be anonymized or tokenized in order to preserve the privacy of clients and other individuals who can be associated with tagged data.

The data lake system for tagging data can read data residency marker and ensures data is not improperly ingested into locations outside relevant data residency country. The data lake system reads data markers to ensure data is not improperly transferred between relevant countries. Furthermore, the data lake system can read retention markers and on an expiration date it performs the noted behavior. Furthermore, the data lake system can read cloud marker and ensure data is transferred only to the allowable cloud type (public, internal, client) and cloud vendors. The data lake system can read data anonymization markers and ensure data is anonymized as appropriate.

In some implementations, the data lake system reads ownership markers and ensures data is given the appropriate cloud access type (public, internal, client only) and security features (based on information security classifications). The data lake system can read company specific markers and ensure data is viewable only by the appropriate people (Data Access Restriction) and is used only for the appropriate purposes (interpretation, product/service, analytics, marketing/training, tech papers, research, etc. The data lake system can propagate correct markers to derivatives of data. The data lake system can perform extraction and post-extraction governance of data can occur by programs incorporating the data use matrix restrictions to automatically enable the proper uses for each data type.

In some implementations, the data lake system can operate according to various workflows, such as a drill plan workflow, simulation workflow, and/or any other workflow that can be associated with an exploration and production system. These workflows can identify specific uses, which can be embodied in a number of models that can be made available to a client or customer. The models of the data lake system can be in communication with a data use matrix that is connected to general and/or specific data from a variety of sources. The models can include an internal business analysis model, internal predictive health monitoring of tools model, a physics-based model, a model that is inferred through data mining and/or machine learning, a product or service based mode, a risk or safety based model, and/or any other type of data model. The data available to the models can include company specific models, equipment health data, equipment monitoring data, index data, and/or client data that is accessed with permission.

Examples of data ingestion uses can include using data for sale or tender preparation, using data for tool maintenance (e.g., life cycle management), using data as input to a physics-based model for purposes of confirming or improving the accuracy of a model, using data to create a new model through application of data mining or machine learning techniques, using data as input to an existing model for providing a product or service (e.g., engineering a drilling plan), and/or using data for performing anti-collision analysis to prevent drilling into existing wells (e.g., generally reducing risk and ensuring safety through model building).

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the embodiments. However, it will be apparent to one of ordinary skill in the art that various embodiments may be practiced without these specific details. In other instances, well-known features have not been described in detail to avoid unnecessarily complicating the description.

Oilfield Operations

FIGS. 1.1-1.4 illustrate simplified, schematic views of an oilfield 100 having subterranean formation 102 containing reservoir 104 therein in accordance with implementations of various technologies and techniques described herein. FIG. 1.1 illustrates a survey operation being performed by a survey tool, such as seismic truck 106.1, to measure properties of the subterranean formation. The survey operation is a seismic survey operation for producing sound vibrations. In FIG. 1.1, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1.2 illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is generally filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan generally sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 1.3 illustrates a wireline operation being performed by wireline tool 106.3 suspended by rig 128 and into wellbore 136 of FIG. 1.2. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein. In general, wireline tool 106.3 may thereby collect acoustic data and/or image data for a subsurface volume associated with a wellbore.

Wireline tool 106.3 may be operatively connected to, for example, geophones 118 and a computer 122.1 of a seismic truck 106.1 of FIG. 1.1. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1.4 illustrates a production operation being performed by production tool 106.4 deployed from a production unit or christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1.2-1.4 illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1.1-1.4 are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1.1-1.4, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

FIG. 3 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3 is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Data Repository

Figure 4:
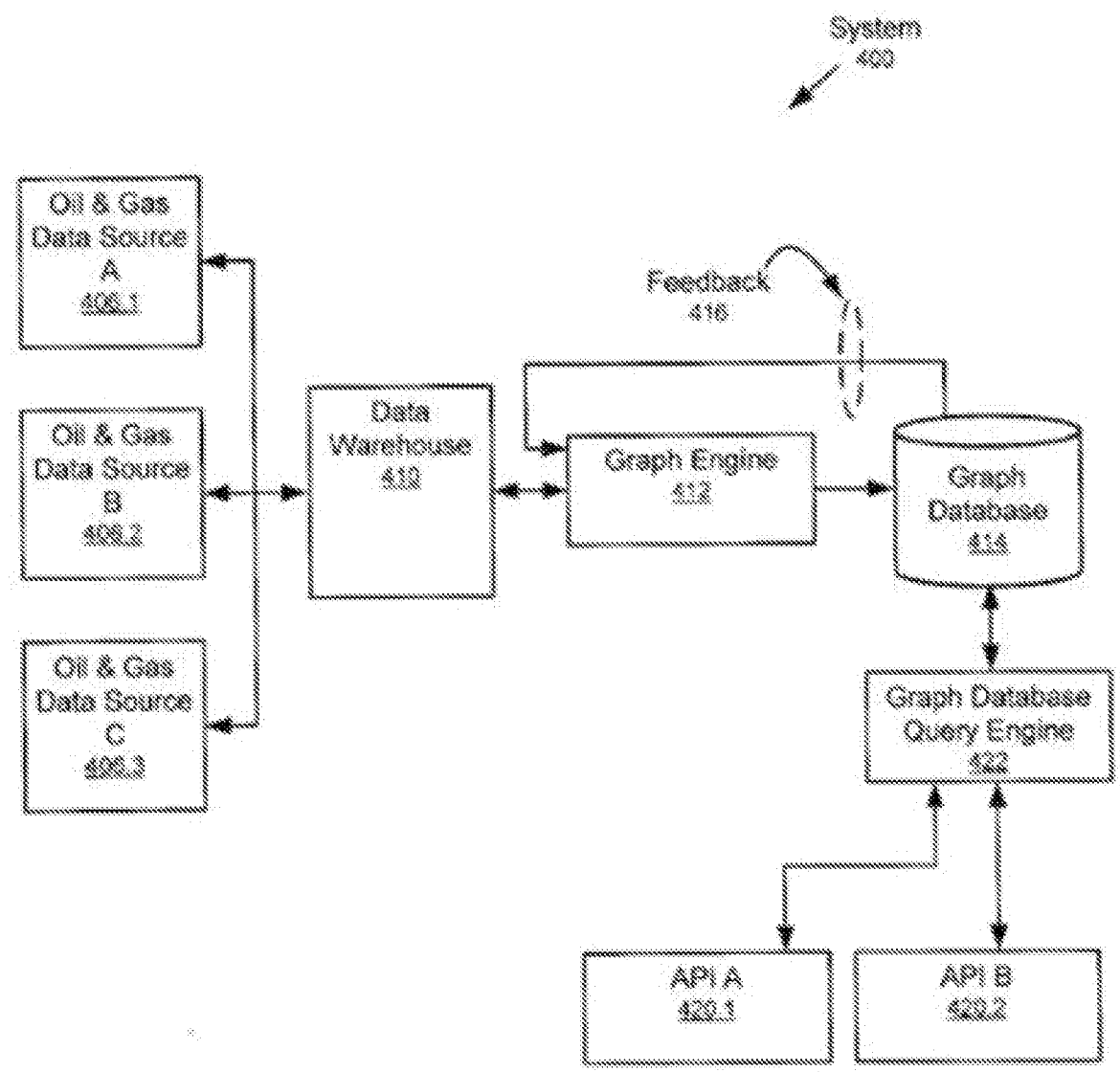
FIG. 4 illustrates a system in accordance with one or more embodiments.

FIG. 4 shows a system 400 in accordance with one or more embodiments. The system 400, or part of the system 400, may be located in a surface unit (e.g., surface unit (134)). As shown in FIG. 4, the system 400 has multiple components including multiple data sources (e.g., Oil & Gas (OG) Data Source A 406.1, Data Source B 406.2, Data Source C 406.3, a data warehouse 410, a graph engine 412, a graph database 414, a graph database query engine 422, and one or more APIs (e.g., API A 420.1, 420.2). Each of the components (406.1, 406.2, 406.3, 410, 412, 414, 422, 420.1, 420.2) may be located on the same computing device (e.g., server, mainframe, personal computer, laptop, tablet PC, smart phone, kiosk, etc.) or on different computing devices connected by a network of any size or topology with wired and/or wireless segments.

As shown in FIG. 4, the system 400 has multiple data sources 406.1, 406.2, 406.3. These data sources 406.1, 406.2, 406.3) may correspond to sensors or measurement tools on site in an oilfield. These data sources 406.1, 406.2, 406.3 may correspond to external databases or websites. The data sources 406.1, 406.2, 406.3) output data items. These data items may be of any type or size relevant to an oilfield. For example, these data items may include well fracturing depth-temperature-energy band data (real-time or playback from previously fractured wells), user annotations and comments, any open literature, etc.

In one or more embodiments, the system 400 includes data warehouse 410. The data warehouse 410 may correspond to one or more repositories. The data warehouse (410) ingests (e.g., obtains and stores) the data values from the data sources 406.1, 406.2, 406.3. The data warehouse 410 is effectively a consolidated source of data items regarding an oilfield.

In one or more embodiments, the system 400 includes the graph engine 412. The graph engine 412 applies one or more transformations (e.g., pipelines) to the data items to generate one or more transformed data items. Application of one or more transformations may be triggered by various conditions (e.g., changes in temperature, pressure, depth, composition in well, etc.). Application of one or more transformations may occur at set times or milestones. One or more transformations may be custom designs. One or more transformation include machine learning. Example transformations include: data cleansing (bound checks, NaN), conversion to different format, aggregates based on one or more state changes, statistical calculations (variance, mode, standard deviation).

In one or more embodiments, the system 414 includes the graph database 414. The graph database 414 implements a knowledge graph for an oilfield. In other words, the graph database 414 is an oil & gas graph database. The graph database 414 includes one or more nodes connected by one or more edges. Each node may correspond to one or more entities in the oilfield. Each edge is a relationship between two or more nodes. In one or more embodiments, the graph engine 412 modifies (e.g., populates, enriches, shrinks, etc.) the graph database 414 based on the transformed data items. This may include modifying existing nodes and edges, removing existing nodes and edges, and/or inserting new nodes and new edges. The nodes or edges may include the transformed data items. For example, nodes may correspond to wells, client/customer ID, chemicals used in the oilfield. Edges may correspond to any links between these nodes & disconnected data silos.

As shown in FIG. 4, there exists a feedback loop 416 from the graph database 414 to the graph engine 412. One or more node or edges in the graph database 414 may be data values that are transformed by the graph engine 412.

In one or more embodiments, the system 400 includes the graph database query engine 422. The graph database query engine 422 receives user requests regarding an oilfield entity and generates a result to the request. The result may be generated by traversing the graph database 414. The result may be a summary or digest regarding the oilfield entity. For example, the user request may be: "Give me a summary of all wells fractured between Dec 01 and Dec 31 in year XXXX for client A."

In one or more embodiments, the system 400 includes multiple APIs 420.1, 420.2. It is through the APIs 420.1, 420.2 that users may issue request and obtain (e.g., view, print) results in response to the request. APIs provide data to monitoring front-end and may have a rich user interface to view data close to real-time in the form of heat maps, line plots, etc.

Figure 5:
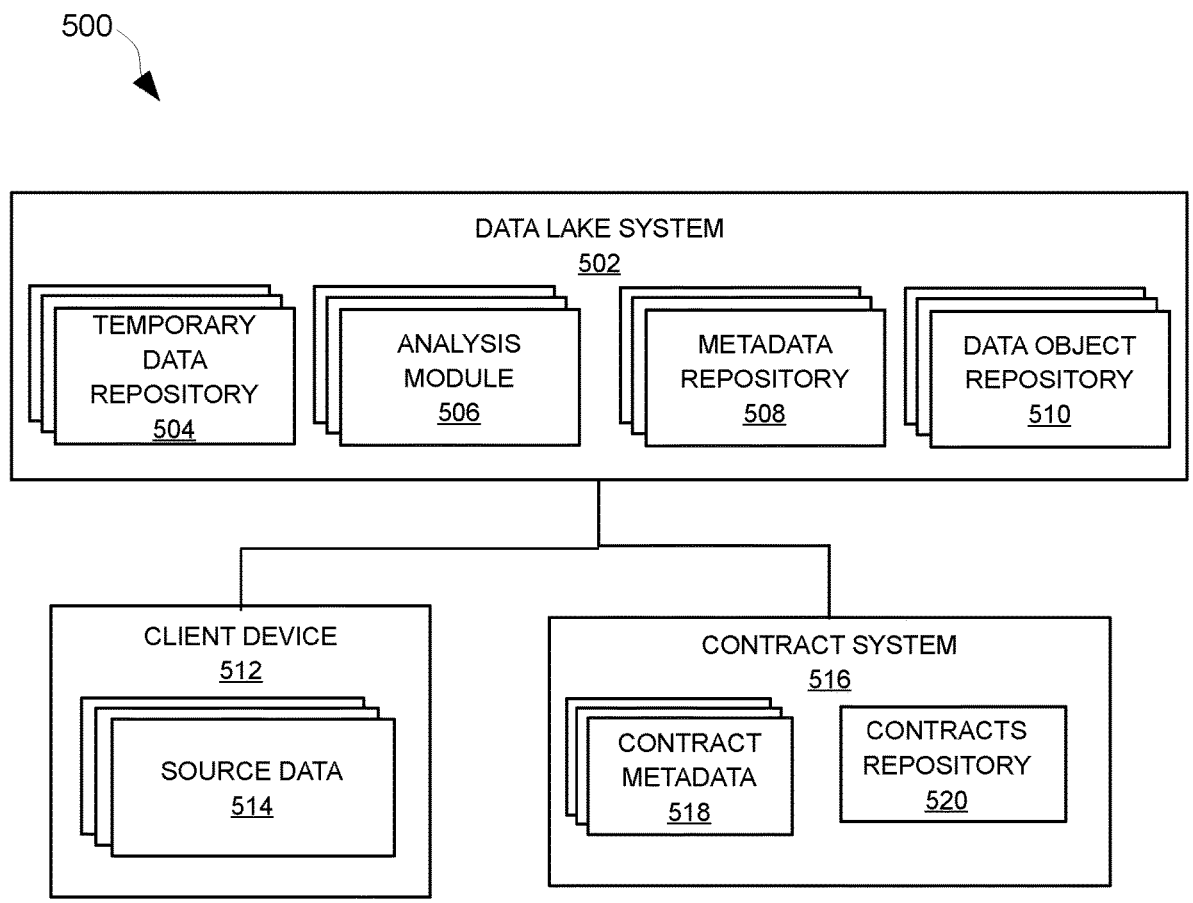
FIG. 5 illustrates a system for providing a data lake that can be automatically updated with data using tags that can correlate the data to portions of an exploration and production system.

FIG. 5 illustrates a system 500 for providing a data lake that can be automatically updated with data using tags that can correlate the data to portions of an exploration and production system. The system 500 can be embodied on one or more computing devices capable of transmitting and receiving data associated with the exploration and production system. The system 500 can include a data lake system 502, capable of receiving exploration and production related data from a variety of different sources. For instance, the data lake system 502 can receive source data 514 from a client device 512 associated with an exploration and production system. The source data 514 can, for example, be generated by a sensor that is operating at an oil field. Sensor data from the sensor can be embodied as source data 514, which can be transmitted over a network to the data lake system 502.

Initially, source data 514 from the client device 512 can be stored at a temporary data repository 504 (i.e., a landing zone) where the source data 514 can be authenticated. Authentication of the source data 514 can include determining whether the source data 514 is associated with an oil and gas system, and/or any other exploration and production related system. Furthermore, authentication of the source data 514 can include identifying, by an analysis module 506 of the data lake system 502, markers that are included with the source data 514. The markers can be used to identify tags that can be correlated with the source data 514. For instance, a similarity between a marker of the source data 514 and a location identified by a tag can be used as a basis for correlating the tag to the source data 514. Furthermore, a similarity between a different marker of the source data 514 and a sensor identifier identified by a different tag can also be used as a basis for correlating the different tag to the source data 514.

In some implementations, the analysis module 506 can flag source data 514 that does include markers. By flagging the source data 514, the source data 514 can be further inspected to identify tags that can be correlated to the source data 514 based on content and/or context of the source data 514. Otherwise, when markers are associated with the source data, the data lake system 502 can communicate with a contract system 516 to identify contract metadata 518 and/or other contract data in a contract repository 520 of the contract system 516. The contract repository 520 and/or contract metadata 518 can include contractual data associated with exploration and production jobs. Such contractual data can provide a basis for generating tags for the received source data 514, making the source data 514 more readily accessible from the data lake system 502. Thereafter, when one or more tags have been correlated to the source data 514, the source data 514, or other object data associated with the source data 514, can be stored at a data object repository 510. Furthermore, any metadata identified based on the source data 514 can be stored at a metadata repository 508 of the data lake system 502.

Figure 6:
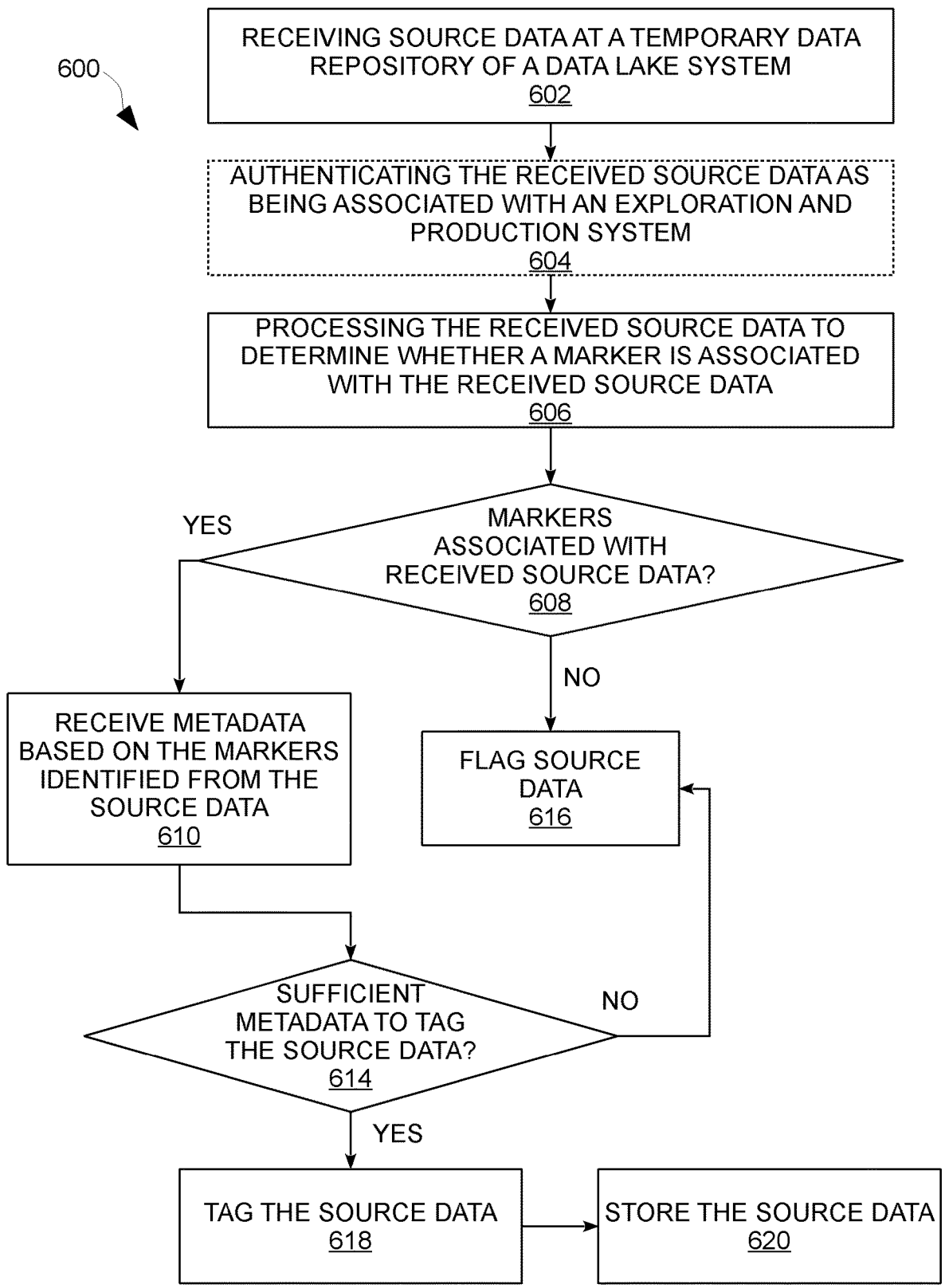
FIG. 6 illustrates a method for automatically updating a data lake system according to source data received from a client device.

FIG. 6 illustrates a method 600 for automatically updating a data lake system according to source data received from a client device. The method 600 can be performed by one or more computing devices capable of managing data associated with an exploration and production system, such as an oil well. The method 600 can include an operation 602 of receiving source data at a temporary data repository of a data lake system. The temporary data repository can be a storage device or a portion of a memory that is associated with the data lake system. The source data can be provided from one or more client devices that generate exploration and production data for processing by remote devices, such as the data lake system. The method 600 can further include an operational operation 604 (as indicated by the dotted outline) of authenticating the received source data as being associated with an exploration and production system. Authenticating the received source data can include processing the receive source data to identifying markers, content, and/or context that provides a correlation between the received source data and the exploration and production system. For instance, a context of the received source data can be a location from which the received source data was provided. If the location corresponds to the location of an exploration and production system, the received source data can be considered authenticated.

The method 600 can further include an operation 606 of processing the received source data to determine whether a marker is associated with the received source data. A marker can be data that is provided with the source data from the client device. In some instances, the marker can provide additional content or context for the source data. At operation 608 of method 600, if a marker is not associated with the source data, the method 600 can proceed to operation 616, where the source data is flagged for inspection. However, at operation 608, if a marker is associated with the received source data, the method 600 can proceed to operation 610 where metadata is received based on the marker or markers identified from the source data. The metadata can be received from source within or outside the data lake system. For instance, the metadata can be previously stored at the data lake system and associated with the markers provided with the source data.

The method 600 can include an operation 614, which can include a determination of whether the received metadata is sufficient to tag the source data. When the metadata is not sufficient to tag the source data, the method 600 can proceed to operation 616 where the source data is flagged for further inspection. Furthermore, at operation 614, when the metadata is sufficient to tag the source data, the method 600 can proceed to operation 618 where the source data is tagged. By tagging the source data based on the received metadata, data in the data lake system can be more readily categorized and available for access by various client devices. At operation 620, the source data can be stored in a data object repository of the data lake system for subsequent access by client devices seeking to analyze and/or process the data for different services.

Tags can be used to determine access or permissions for certain data objects in the data object repository. Other tags can be descriptive, thereby offering information about how the data came to be at the data object repository. For example, the tags can include a date and time a data object was generated, received, and/or stored. The tags can also include an expiration data for the data object, actions to perform upon expiration of the data object, whether anonymization of the data object has been requested, details of the anonymization, one or more persons associated with the upload of the data object, a business (e.g., an internal company unit) associated with the upload of the data object, other data access restrictions to the data object, right of use for the data object (e.g., commercially, non-commercially, in marketing, in training, as part of a product/service, for analytics, for research, for technical papers, for distribution to particular clients), and whether any license is associated with the data object (e.g., for example, as may be provided with the third-party public data objects licensed under open source license schema). Other tags can also be included based on information collected during the upload or ingestion of the source data into the data lake system.

The tags that can be associated with the source data can include object identifier tags, data type tags, origin tags, relevant country tags, originator tags, and/or any other tags that can be associated with data. For instance, the data type tags can include company specific data types, public domain data types, index data, client data, third party data, etc. The origin tags can include country codes, and/or any other data that identifies a geographic location of data. In some implementations, the tags can include legal or access group tags. These tags can identify security classifications, export classifications, export restrictions, personal data, contractual data, and/or any other data that can be associated with restrictions or access to data. For instance, the security classification tags can include public, private, confidential, and/or secret identifier tags. The export classification tags can include a non-technical data tag, and/or a pending classification tag. The export restriction tag can include an unconventional restriction tag and/or a future scope restriction tag. The personal data tags can include personally identifiable, sensitive personal, no personal data, and/or any tag that can be used to identify personal information. The contractual data tags can include a contract identifier, an unknown identifier, and/or a no contract related identifier. It will be appreciated that the various types of tags discussed above are not exclusive, and that an innumerable variety of other tags may be envisioned by those of ordinary skill having the benefit of the instant disclosure. Therefore, the invention is not limited to the particular tags discussed herein.

Figure 7:
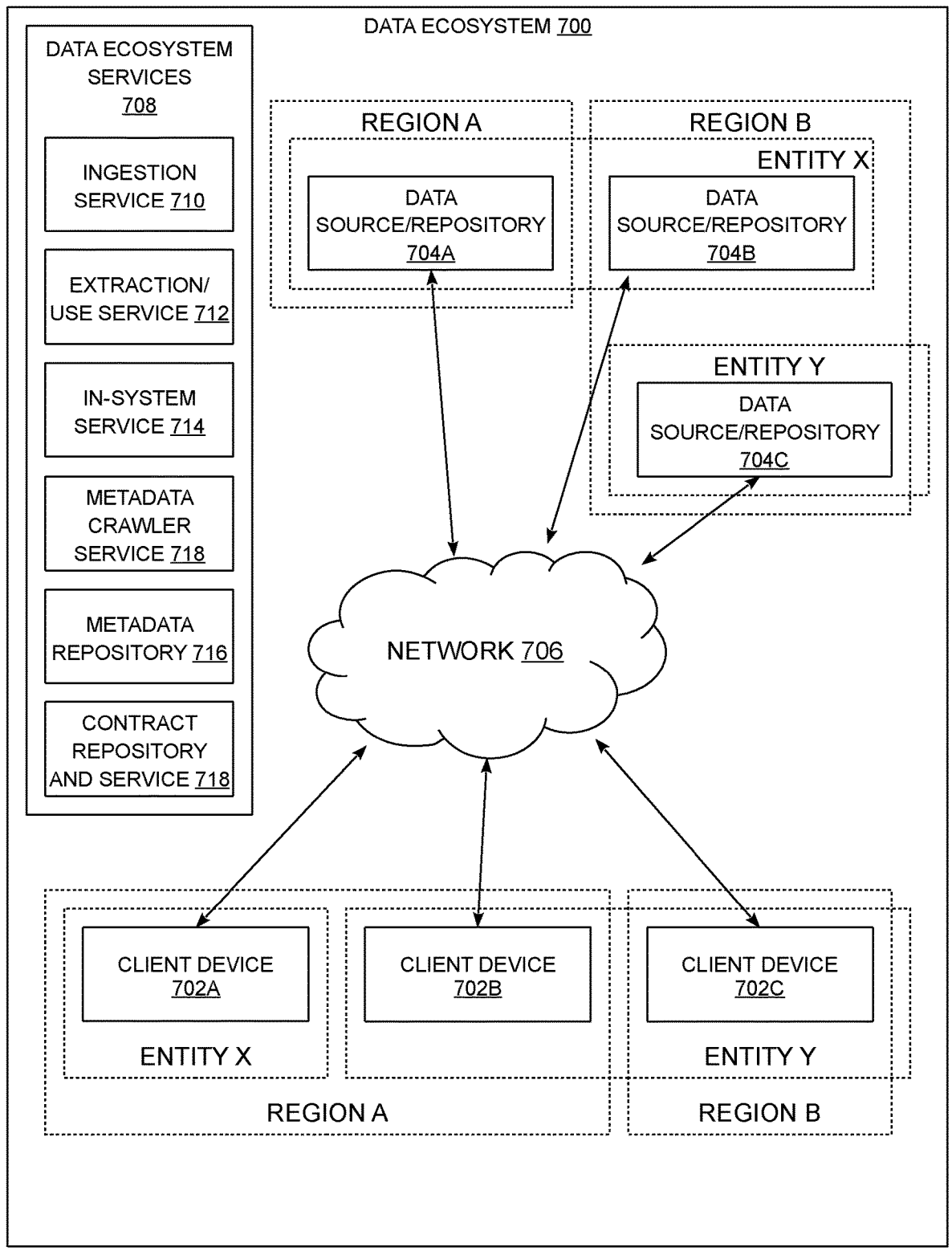
FIG. 7 illustrates a data ecosystem for providing a data lake that can be automatically updated with data using tags that can correlate the data to portions of an exploration and production system.

FIG. 7 illustrates another example embodiment within which the techniques described herein may be used, where a data lake is implemented by a data ecosystem 700 that couples together a plurality of client devices 702A-C with a plurality of data sources and/or repositories 704A-C through one or more networks 706. Each data source/repository may be resident within a client system, within a private cloud system, within a shared cloud system, within a public system, within a field, well or surface device, or within practically any other system that may serve as a source of oil & gas data and/or as a repository of oil & gas data. In some instances, data sources may even be associated with tools, sensors or other real time data collection equipment that automatically transmit data to the data ecosystem for ingestion on a continuous or periodic basis.

As represented in FIG. 7, both clients and data sources/repositories may be associated with various geographical or other classifications, e.g., ownership, among others, as represented by Regions A and B and Entities X and Y. As will become more apparent below, access to data may be restricted based upon these classifications both from the standpoint of the data sources/repositories providing the data and the clients accessing the data. As but one example, FIG. 7 illustrates a data source/repository 704C associated with Entity Y and Region B, client device 702C, which is similarly associated with Entity Y and Region B, may be permitted to access data source 704C, while client device 702A may be restricted from accessing the data because it is associated with a different entity, while client device 702B may be restricted from accessing the data because it is associated with a different region for which an export restriction exists. If no export restriction exists, however, access by client device 702B may still be permitted.

In this embodiment, while some of the data that is ingested into data ecosystem 700 may be loaded into a data repository for the data ecosystem itself (e.g., a data warehouse for the data ecosystem), the data ecosystem is not so limited. Even when ingested into the data ecosystem, some data may still be maintained within a data repository that is external from the data ecosystem, yet the data may still be accessible by client devices via the data ecosystem based upon the metadata generated during the ingestion process. As such, some embodiments do not require that the data ingested into a data ecosystem be physically present within the data ecosystem itself.

Data ecosystem 700 may include various services 708 to implement the various features described herein, including, for example, an ingestion service 710 that manages the ingestion of data into the data ecosystem, an extraction and use service 712 that manages the extraction, use or consumption of data in the data ecosystem, and an in-system service 714 that governs data resident within the data ecosystem (e.g., to ensure that data housed within a data repository of the data ecosystem is not moved between geographical locations in a manner that was prohibited by export restrictions). In addition, a metadata repository 716 may store metadata describing the various data managed within the data ecosystem, and may provide such data to services 710-714 to control the ingestion, maintenance, and extraction/use of data managed within the data ecosystem. A metadata crawler service 718 may be used to crawl the metadata and periodically revalidate the metadata, since even though metadata may be valid when its associated data was ingested, geopolitical, ownership or other changes may occur thereafter that could alter who is authorized to access the data. As such, the metadata crawler service may periodically revalidate metadata to accommodate such possibilities. A contract repository and service 718 may also be provided and may function similar to contract system 516 of FIG. 5 to further control access to data managed by the data ecosystem.

Metadata may be used to characterize data in a number of manners in various embodiments. For example, metadata may define whether data is internal to the data ecosystem provider, public, client, or third party. Metadata may also define residency and/or ownership for the data, sensitivity of the data (e.g., client confidential vs. public), type of the data (e.g., sensor data vs. marketing data), relationships to other data (e.g., data that is a derivative of other data vs. data that is based on an interpretation of other data), use restrictions (e.g., usable for all purposes or restricted to limited types of uses), storage restrictions (e.g., limited to certain types of cloud providers), contact data (e.g., identifying a controlling contract), among other metadata types described above.

Figure 8:
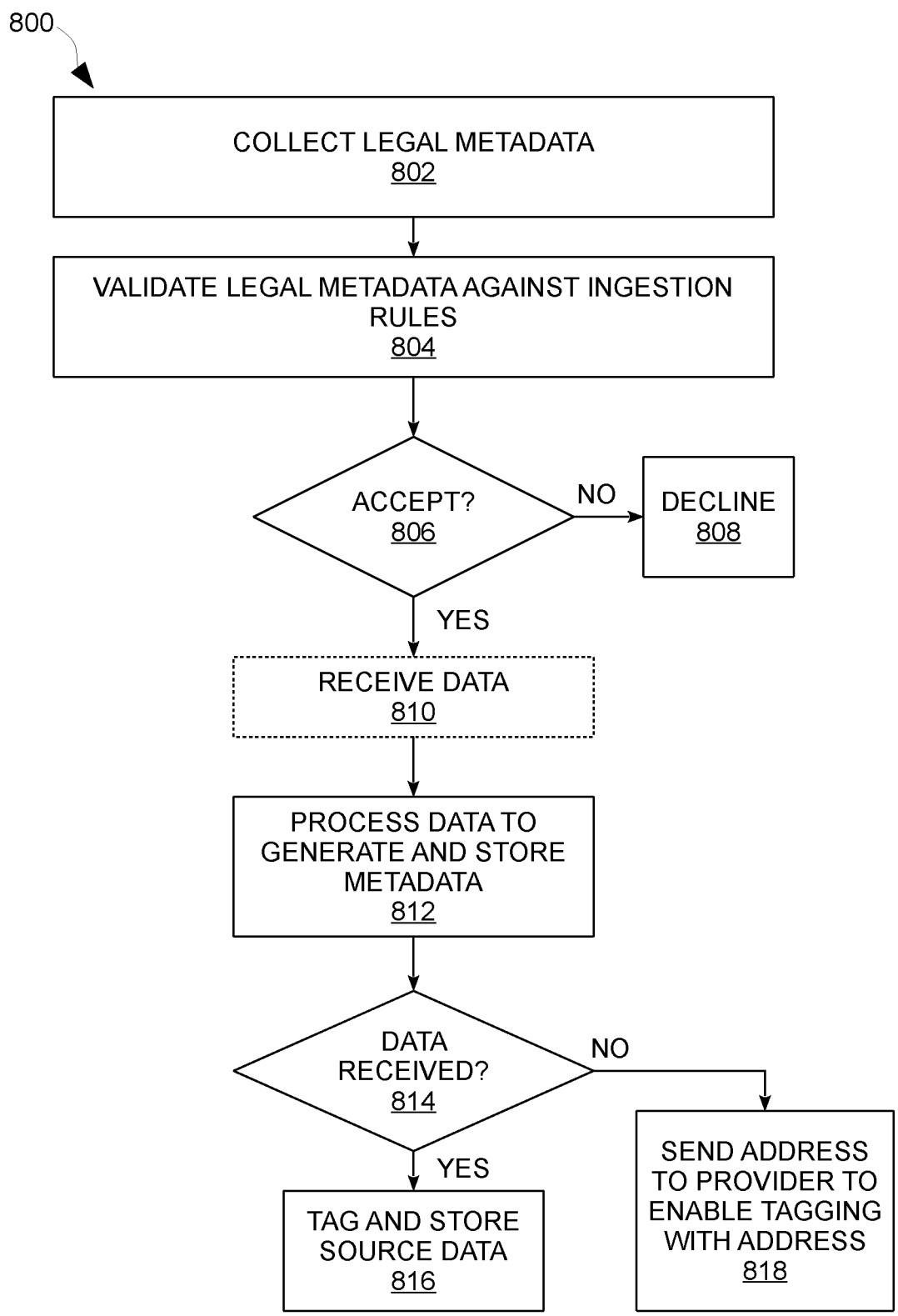
FIG. 8 illustrates a method for ingesting data into the data ecosystem.

An example automated ingestion process 800, e.g., as may be performed by ingestion service 710, is illustrated in greater detail in FIG. 8. In response to the receipt of data for ingestion, legal metadata may be collected in block 802, e.g., based upon automatic and/or manual tagging. Examples of automatic tagging include tagging based upon the source of the ingestion request (user, location, device identifier, IP address), tagging that is automatically appended to a request (e.g., based upon settings stored in on a tool that automatically transmits data), etc. Manual tagging may include data entered manually by a user requesting data ingestion, as an example.

Next, in block 804, the legal metadata is validated against one or more ingestion rules maintained in the data ecosystem. Ingestion rules may reject ingestion requests based upon inconsistent metadata tags, contract restrictions, residency restrictions, export restrictions, etc., and thus if the legal metadata is not validated, block 806 passes control to block 808 to decline the request. Otherwise, block 806 passes control to block 810 to optionally receive the data. Block 810 is executed only when a request is for data that is to be maintained within the data ecosystem, so for data that will be maintained in its original location, block 810 may be omitted.

Next, in block 812, the data to be ingested is processed to generate and store metadata for the data, including the aforementioned legal metadata as well as any other metadata that may be provided with the request or otherwise automatically generated. The metadata is stored in the metadata repository, and thereafter, if the data was uploaded to the data ecosystem in block 810, block 814 passes control to block 816 to tag (e.g., using a unique identifier) and store the source data in a data repository of the data ecosystem. Otherwise, block 814 passes control to block 816 to send a unique address to the provider of the data to enable the provider to appropriately tag the data with the unique address, thereby enabling the data to be retrieved from its original location when used or consumed.

Figure 9:
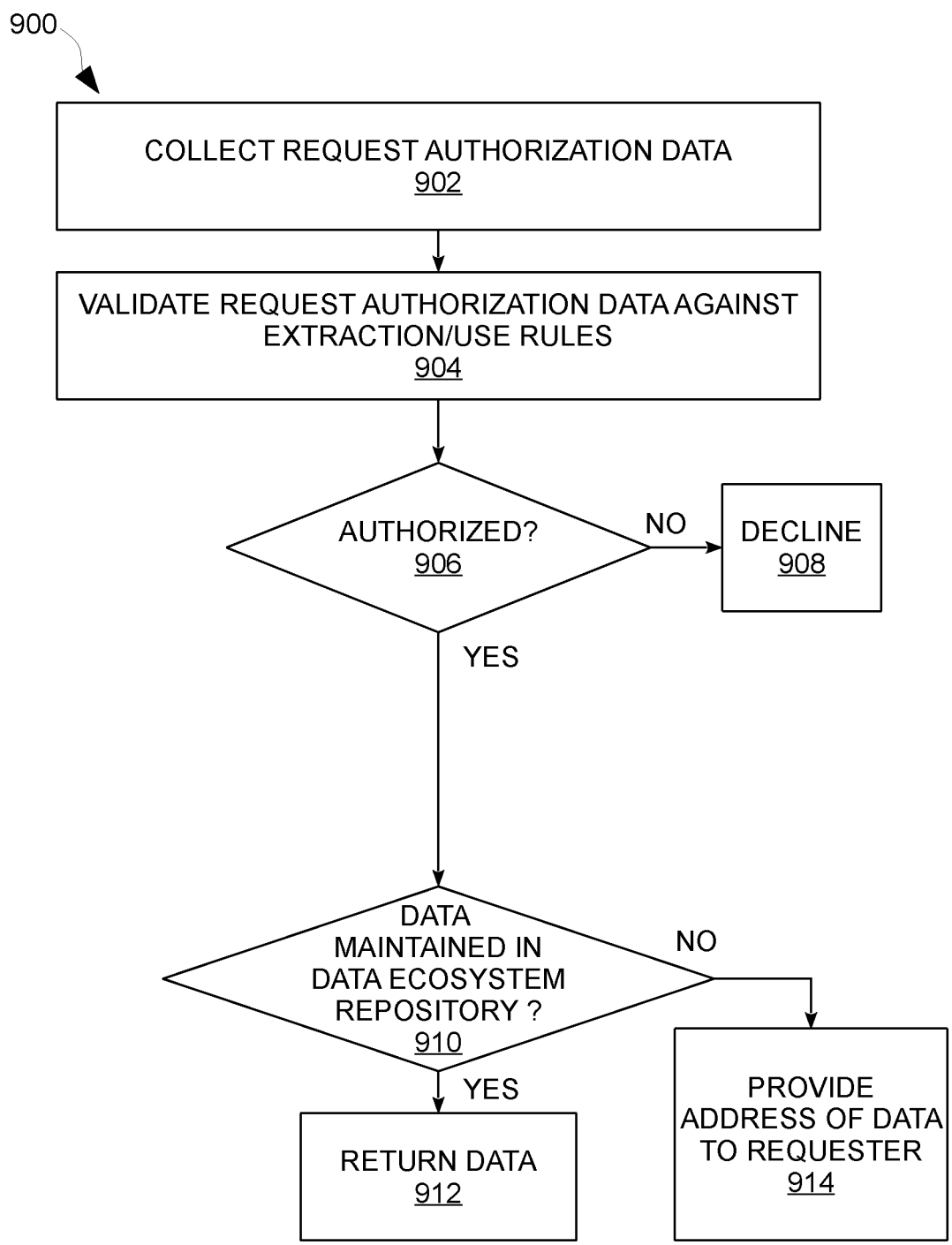
FIG. 9 illustrates a method for consuming data from the data ecosystem.

FIG. 9 illustrates an automated validation process 900, e.g., as may be performed by extraction/use service 712 whenever a request to access, use or otherwise consume data managed by the data ecosystem. Process 900 may also be used in connection with searching uses of the data in some embodiments, such that the data will not even be returned as a search result even where metadata for the data matches a search criterion. Authorization, in this embodiment, may be based upon various factors, e.g., (1) the identity of the requester, (2) where the requester is located, (3) what application the requester is requesting the data for, and (4) how the data will be used. Thus, for example, block 902 may collect request authorization data and block 904 may validate this data against various extraction/use rules maintained in the data ecosystem, and based upon this validation, block 906 may either decline the request (block 908) or accept the request. In the case where the request is to retrieve the data, for example, block 906 may, upon proper authorization, pass control to block 910 to determine whether the requested data is maintained in a data ecosystem repository, and if so, pass control to block 912 to return the requested data. Otherwise, control may pass to block 914 to provide the address of the data to the requester to enable the data to be retrieved by the requester from the original, external repository for the data.

Validation may be based on legal metadata, e.g., contract metadata for any applicable contracts, residency and/or ownership data (e.g., export restrictions, privacy restrictions, country of origin restrictions, TCC restrictions, security/classification restrictions), use metadata such as intended use (e.g., marketing, publication, research, analytics, interpretation, etc.), requester metadata (e.g., to limit access to only those individuals or entities authorized to access the data), application metadata (e.g., to limit access to only certain applications), etc.

Other variations will be apparent to those of ordinary skill having the benefit of the instant disclosure. Therefore, the invention is not limited to the particular tags, data types, rules, and restrictions explicitly discussed herein.

Representative Hardware and Software Environment

Figure 10:
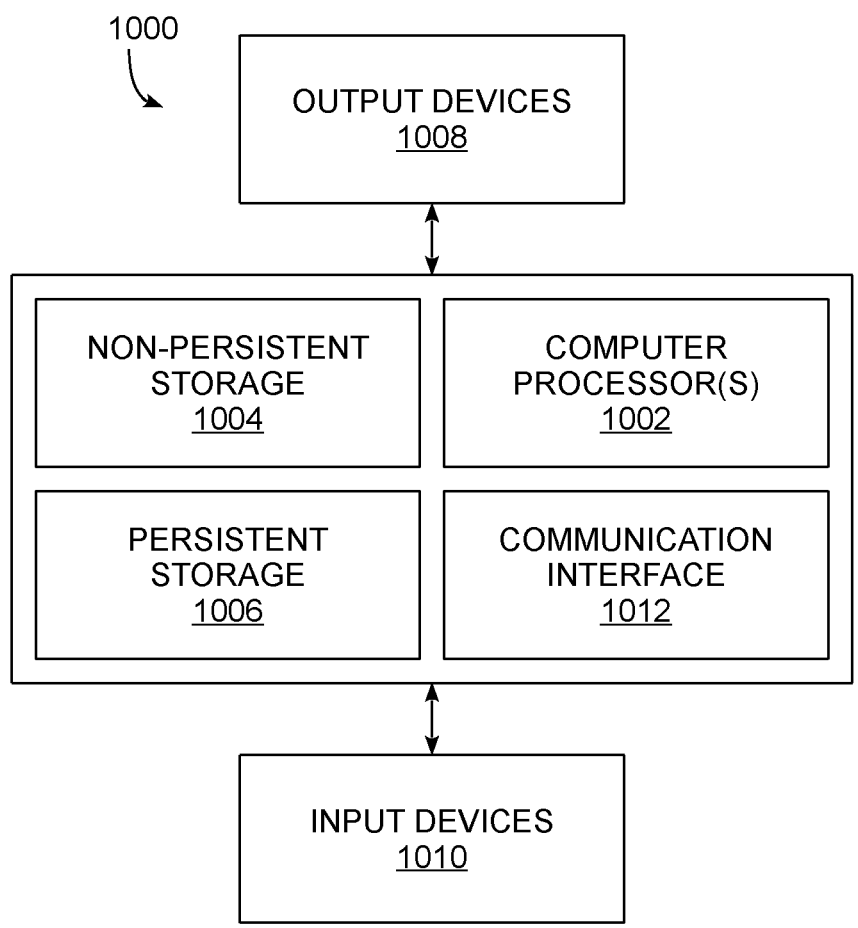
FIG. 10 illustrates a computing system that can access and/or embody the data lake system according to some implementations.

Embodiments may be implemented on a computing system. Any combination of mobile, desktop, server, router, switch, embedded device, or other types of hardware may be used. For example, as shown in FIG. 10, the computing system 1000 may include one or more computer processors 1002, non-persistent storage 1004 (e.g., volatile memory, such as random access memory (RAM), cache memory), persistent storage 1006 (e.g., a hard disk, an optical drive such as a compact disk (CD) drive or digital versatile disk (DVD) drive, a flash memory, etc.), a communication interface 1012 (e.g., Bluetooth interface, infrared interface, network interface, optical interface, etc.), and numerous other elements and functionalities.

The computer processor(s) 1002 may be an integrated circuit for processing instructions. For example, the computer processor(s) may be one or more cores or micro-cores of a processor. The computing system 1000 may also include one or more input devices 1010, such as a touchscreen, keyboard, mouse, microphone, touchpad, electronic pen, or any other type of input device.

The communication interface 1012 may include an integrated circuit for connecting the computing system 1000 to a network (not shown) (e.g., a local area network (LAN), a wide area network (WAN) such as the Internet, mobile network, or any other type of network) and/or to another device, such as another computing device.

Further, the computing system 1000 may include one or more output devices 1008, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 1002, non-persistent storage 1004, and persistent storage 1006. Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

Figure 11:
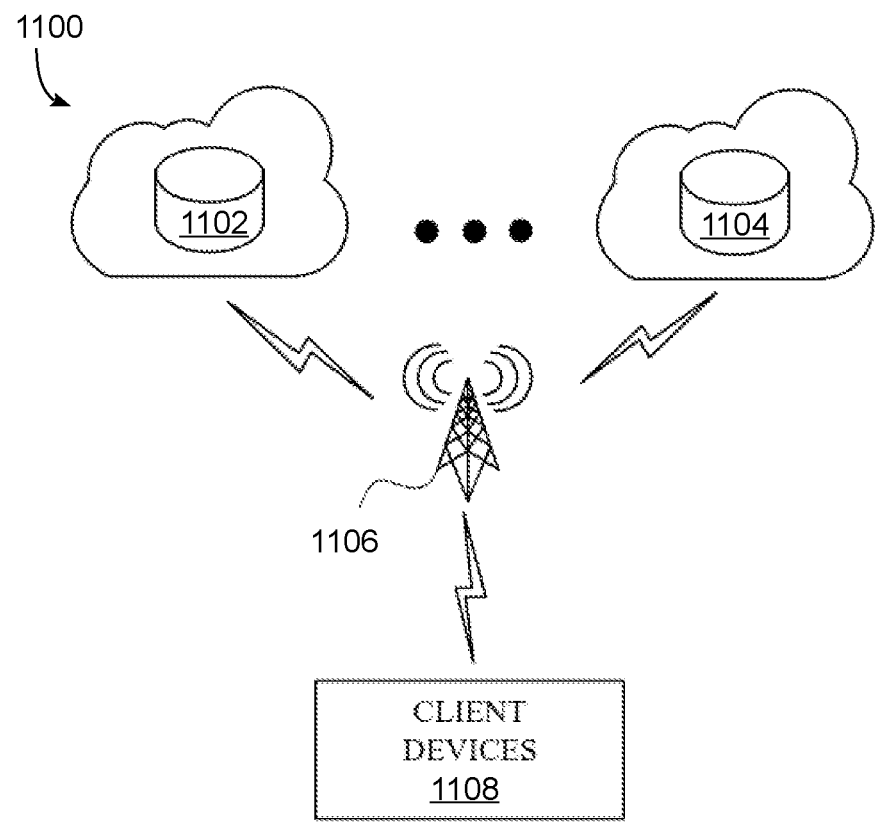
FIG. 11 illustrates a network that can employ the data lake system according to some implementations.

The computing system 1000 in FIG. 10 may be connected to or be a part of a network, such as the network 1106 described by system 1100 of FIG. 11. For example, as shown in FIG. 11, the network 1106 may include multiple nodes (e.g., node X 1102, node Y 1104). Each node may correspond to a computing system, such as the computing system shown in FIG. 10, or a group of nodes combined may correspond to the computing system shown in FIG. 10. By way of an example, embodiments may be implemented on a node of a distributed system that is connected to other nodes. By way of another example, embodiments may be implemented on a distributed computing system having multiple nodes, where each portion of the embodiment may be located on a different node within the distributed computing system. Further, one or more elements of the aforementioned computing system 1100 may be located at a remote location and connected to the other elements over a network.

Although not shown in FIG. 11, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X 1102, node Y 1104) in the network 1106 may be configured to provide services for a client device 1108. For example, the nodes may be part of a cloud computing system. The nodes may include functionality to receive requests from the client device 1108 and transmit responses to the client device 1108. The client device 1108 may be a computing system, such as the computing system shown in FIG. 10. Further, the client device 1108 may include and/or perform all or a portion of one or more embodiments.

The computing system or group of computing systems described in FIGS. 10 and 11 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

The above description of functions present only a few examples of functions performed by the computing system of FIG. 10 and the nodes and/or client device in FIG. 11. Other functions may be performed using one or more embodiments.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:
   receiving data from a client device, the data associated with an operation occurring at an exploration and production system;
   analyzing the received data to extract a data marker associated with the received data;
   determining, based on the data marker, that metadata is available at a data lake system for tagging the received data, wherein determining that the metadata is available comprises determining a similarity between a tag at the data lake system and the data marker, wherein the metadata is associated with a contract that is embodied as contractual metadata stored in a remote device that is separate from a device that hosts the data lake system, and wherein the tag is a contract data tag comprising a contract identifier, wherein the contractual metadata is a location associated with the contract, and wherein the data marker identifies a location where the received data was transmitted; and based on the metadata being available for tagging the received data based on the similarity, tagging the received data with the tag to provide a correlation between the received data and existing data in the data lake system.

2. The method of claim 1, wherein the received data is stored at a temporary data repository of the data lake system during the analyzing of the received data.

3. The method of claim 1, further comprising:
receiving second data;
analyzing the received second data to extract a second data marker associated with the received second data;
determining, based on the data marker, that second metadata is unavailable at the data lake system for tagging the received second data; and
based on the second metadata being unavailable for tagging the received second data, flagging the received second data for further processing by the data lake system.

4. The method of claim 1, wherein the data is received from the client device concurrently with to the operation occurring at the exploration and production system.

5. The method of claim 1, further comprising:
based on the metadata being available for tagging the received data, storing the received data in association with the metadata in a data object repository of the data lake system.

6. The method of claim 1, wherein the data marker identifies a geographic location from which the received data was transmitted.

7. The method of claim 1, further comprising:
authenticating the received data according to whether the received data corresponds to the exploration and production system.

8. A system, comprising:
one or more processors; and
memory configured to store instructions that, when executed by one or more processors, cause the one or more processors to perform operations that include:
receiving data from a client device, the data associated with an operation occurring at an exploration and production system;
analyzing the received data to extract a data marker is associated with the received data;
determining, based on the data marker, that metadata is available at a data lake system for tagging the received data, wherein determining that the metadata is available comprises determining a similarity between a tag at the data lake system and the data marker, wherein the metadata is associated with a contract that is embodied as contractual metadata stored in a remote device that is separate from a device that hosts the data lake system, and wherein the tag is a contract data tag comprising a contract identifier, wherein the contractual metadata is a location associated with the contract, and wherein the data marker identifies a location where the received data was transmitted; and
based on the metadata being available for tagging the received data based on the similarity, tagging the received data with the tag to provide a correlation between the received data and existing data in the data lake system.

9. The system of claim 8, wherein the received data is stored at a temporary data repository of the data lake system during the analyzing of the received data.

10. The system of claim 8, wherein the operations further include:
receiving second data;
analyzing the received second data to extract a second data marker associated with the received second data;
determining, based on the data marker, that second metadata is unavailable at the data lake system for tagging the received second data; and
based on the second metadata being unavailable for tagging the received second data, flagging the received second data for further processing by the data lake system.

11. The system of claim 8, wherein the data is received from the client device concurrently with the operation occurring at the exploration and production system.

12. The system of claim 8, wherein the operations further include:
based on the metadata being available for tagging the received data, storing the received data in association with the metadata in a data object repository of the data lake system.

13. The system of claim 8, wherein the data marker identifies a geographic location from which the received data was transmitted.

14. The system of claim 8, wherein the operations further include:
authenticating the received data according to whether the received data corresponds to the exploration and production system.

15. A non-transitory computer readable medium configured to store instructions that, when executed by one or more processors, cause the one or more processors to perform operations that include:
receiving data from a client device, the data associated with an operation occurring at an exploration and production system;
analyzing the received data to extract a data marker is associated with the received data;
determining, based on the data marker, that metadata is available at a data lake system for tagging the received data, wherein determining that metadata is available comprises determining a similarity between a tag at the data lake system and the data marker, wherein the metadata is associated with a contract that is embodied as contractual metadata stored in a remote device that is separate from a device that hosts the data lake system, and wherein the tag is a contract data tag comprising a contract identifier, wherein the contractual metadata is a location associated with the contract, and wherein the data marker identifies a location where the received data was transmitted; and
based on the metadata being available for tagging the received data based on the similarity, tagging the received data with the tag to provide a correlation between the received data and existing data in the data lake system.

16. The non-transitory computer readable medium of claim 15, wherein the received data is stored at a temporary data repository of the data lake system during the analyzing of the received data.

17. The non-transitory computer readable medium of claim 15, wherein the operations further include:
receiving second data;
analyzing the received second data to extract a second data marker associated with the received second data;

determining, based on the data marker, that second metadata is unavailable at the data lake system for tagging the received second data; and based on the second metadata being unavailable for tagging the received second data, flagging the received second data for further processing by the data lake system.

18. The non-transitory computer readable medium of claim 15, wherein the data is received from the client device concurrently with the operation occurring at the exploration and production system.

19. The non-transitory computer readable medium of claim 15, wherein the operations further include:

based on the metadata being available for tagging the received data, storing the received data in association with the metadata in a data object repository of the data lake system.

20. The non-transitory computer readable medium of claim 15, wherein the data marker identifies a geographic location from which the received data was transmitted.

21. The non-transitory computer readable medium of claim 15, wherein the operations further include:

authenticating the received data according to whether the received data corresponds to the exploration and production system.

* * * * *